(12) United States Patent
Lin (10) Patent No.: US 8,416,353 B2
(45) Date of Patent: Apr. 9, 2013

(54) BACKLIGHT FREQUENCY-MODULATION CONTROLLED 3D DISPLAY

(75) Inventor: Jyh-Wei Lin, Hsinchu (TW)

(73) Assignee: AU Optronics Corporation, Hsinchu (TW)

( * ) Notice: Subject to any disclaimer, the term of this patent is extended or adjusted under 35 U.S.C. 154(b) by 295 days.

(21) Appl. No.: 12/803,630

(22) Filed: Jun. 30, 2010

(65) Prior Publication Data

US 2012/0002122 A1 Jan. 5, 2012

(51) Int. Cl.
G02F 1/1335 (2006.01)

(52) U.S. Cl.
USPC .......................................................... 349/15

(58) Field of Classification Search .................. None
See application file for complete search history.

(56) References Cited

U.S. PATENT DOCUMENTS

| | | | |
|---|---|---|---|
| 5,821,989 A * | 10/1998 | Lazzaro et al. | 348/56 |
| 6,456,432 B1 * | 9/2002 | Lazzaro et al. | 359/464 |
| 6,678,091 B2 * | 1/2004 | Tropper | 359/462 |
| 7,242,422 B2 * | 7/2007 | Chen et al. | 348/43 |
| 7,345,659 B2 | 3/2008 | Chang | 345/76 |
| 7,400,308 B2 | 7/2008 | Chang | 345/76 |
| 7,604,348 B2 | 10/2009 | Jacobs et al. | 351/159 |
| 2001/0028413 A1 | 10/2001 | Tropper | |
| 2007/0035483 A1 | 2/2007 | Chang | 345/76 |
| 2007/0035484 A1 | 2/2007 | Chang | 345/76 |
| 2009/0002265 A1 | 1/2009 | Kitaoka et al. | |
| 2009/0109282 A1 | 4/2009 | Schnebly et al. | |
| 2009/0251531 A1 | 10/2009 | Marshall et al. | |
| 2010/0289883 A1 | 11/2010 | Goris et al. | |

FOREIGN PATENT DOCUMENTS

| | | |
|---|---|---|
| CN | 101382680 A | 3/2009 |
| CN | 101640029 A | 2/2010 |
| EP | 2056155 | 5/2009 |
| JP | 8331603 | 12/1996 |
| JP | 11038361 A | 2/1999 |
| TW | 399738 Y | 7/2000 |
| TW | I312634 | 7/2009 |
| TW | 201004312 | 1/2010 |
| WO | 2009069026 | 6/2009 |

OTHER PUBLICATIONS

English Abstract of CN 101382680A, published Mar. 11, 2009, Chi Mei Electronics Co. Ltd. (1 page).
English Abstract of CN 101640029, published Feb. 3, 2010, Chi Mei Optoelectronics Co. Ltd. (1 page).
English Abstract of WO 2009069026, published Jun. 4, 2009, Koninkl Philips Electronics NV (1 page).
English Abstract of EP 2056155, published May 6, 2009, Boeing Co (1 page).
English Abstract of JP 8331603, published Dec. 13, 1996, Canon KK (1 page).

\* cited by examiner

*Primary Examiner* — Sung Pak (57) ABSTRACT

A 3D display system has a timing control device for synchronizing the opening and closing of shutters on a viewing apparatus. The display system comprises a display unit configured to alternately show a right image and a left image in a sequence. The display unit has a backlight unit to illuminate a display panel. The light output from the backlight unit is frequency-modulated with one frequency when a right image is displayed and another frequency when the left image is displayed. The viewing apparatus has a photo-detector and a frequency discrimination circuit to detect the modulation frequencies in the light output. Based on the detected modulation frequencies, the shutters on the viewing apparatus can be opened and closed in a coordinated way.

20 Claims, 7 Drawing Sheets

BACKLIGHT FREQUENCY-MODULATION CONTROLLED 3D DISPLAY

BACKGROUND OF THE INVENTION

In a 3D display system, a display is used to alternately show a right image and a left image and a viewing apparatus having a right shutter and a left shutter alternately opened to allow a viewer to see the right image with the right eye and the left image with the left eye through the opened shutter. The viewing apparatus is usually shaped like a pair of glasses to allow the viewer to wear it while viewing the display.

It is essential that the shutters on the viewing apparatus open and close at the right times, in steps of the showing on the display.

SUMMARY OF THE INVENTION

The present invention provides a method and apparatus for synchronizing the opening and closing of the shutters on a viewing apparatus to be used with a 3D display system. The display system comprises a display unit configured to alternately show a right image and a left image in a sequence. The display unit has a backlight unit to illuminate a display panel. The light output from the backlight unit is frequency-modulated with one frequency when a right image is displayed and another frequency when the left image is displayed. The viewing apparatus has a photo-detector and a frequency discrimination circuit to detect the modulation frequencies of the light output. Based on the detected modulation frequencies, the shutters on the viewing apparatus can be opened and closed in a coordinated way.

Thus, the first aspect of the present invention is a method for use in a display system. The display system comprises: a display panel configured to display a sequence of display images, the display images separately comprising left-view images and right-view images; a light source configured to provide illumination to the display panel; and a viewing apparatus for viewing the display images. The method comprises the steps of modulating the output of the light source in a first frequency during at least part of a time period when at least one of the left-view images is displayed; and modulating the light source output in a second frequency during at least part of a time period when at least one of the right-view images is displayed.

According to the present invention, the viewing apparatus comprises:

a detector configured to detect the light output of the light source; a first shutter configured to open for viewing the left-view images; and a second shutter configured to open for viewing the right-view images. The method further comprises: opening the first shutter when the light source output is modulated in the first frequency; and opening the second shutter when the light source output is modulated in the second frequency.

According to one embodiment of the present invention, the time period when said at least one of the left-view images is displayed comprises a first data loading period, and the time period when said at least one of the right-view images is displayed comprises a second data loading period. The method further comprises modulating the light source output in a third frequency in the first data loading period and in the second data loading period; and closing the first shutter and the second shutter when the light source output is modulated in the third frequency.

According to the present invention, the display panel is configured to receive a data stream comprising left-view image data and right-view image data, the data stream comprising information indicative of the left-view image data and the right-view image data, and wherein said modulating the light source output in the first frequency and in the second frequency is based on the information.

The second aspect of the present invention is a display system, which comprises:

a display panel configured to display a sequence of display images, the display images separately comprising left-view images and right-view images;

a light source configured to provide illumination to the display panel, and a light source driver for providing electrical power to the light source, the light source driver configured to control the electrical power so as to modulate the light source output in a first frequency during at least part of a time period when at least one of the left-view images is displayed, and to modulate the light source output in a second frequency during at least part of a time period when at least one of the right-view images is displayed.

According to the present invention, the system also includes a viewing apparatus, comprising:

a detector configured to detect light output of the light source;

a first shutter configured to open for viewing the left-view images when the light source output is modulated in the first frequency; and a second shutter configured to open for viewing the right-view images when the light source output is modulated in the second frequency.

According to one embodiment of the present invention, the first shutter and the second shutter are configured to close when the light source output is modulated in the third frequency.

The display panel can be a liquid crystal display panel, and the light source comprises an array of light emitting diodes.

The third aspect of the present invention is a viewing apparatus, comprising:

a detector configured to detect light output from a light source;

a first shutter configured to open when the light source output is modulated in a first frequency; and a second shutter configured to open when the light source output is modulated in a different second frequency.

According to one embodiment of the present invention, the detector comprises:

an optoelectric sensor configured to provide, in response to the light output, an electronic signal indicative of a modulation frequency in the light source; and a shutter driver, responsive to the electronic signal, configured to open the first shutter when the light source output is modulated in a first frequency, and to open the second shutter when the light source output is modulated in the second frequency.

DETAILED DESCRIPTION OF THE INVENTION

Figure 1:
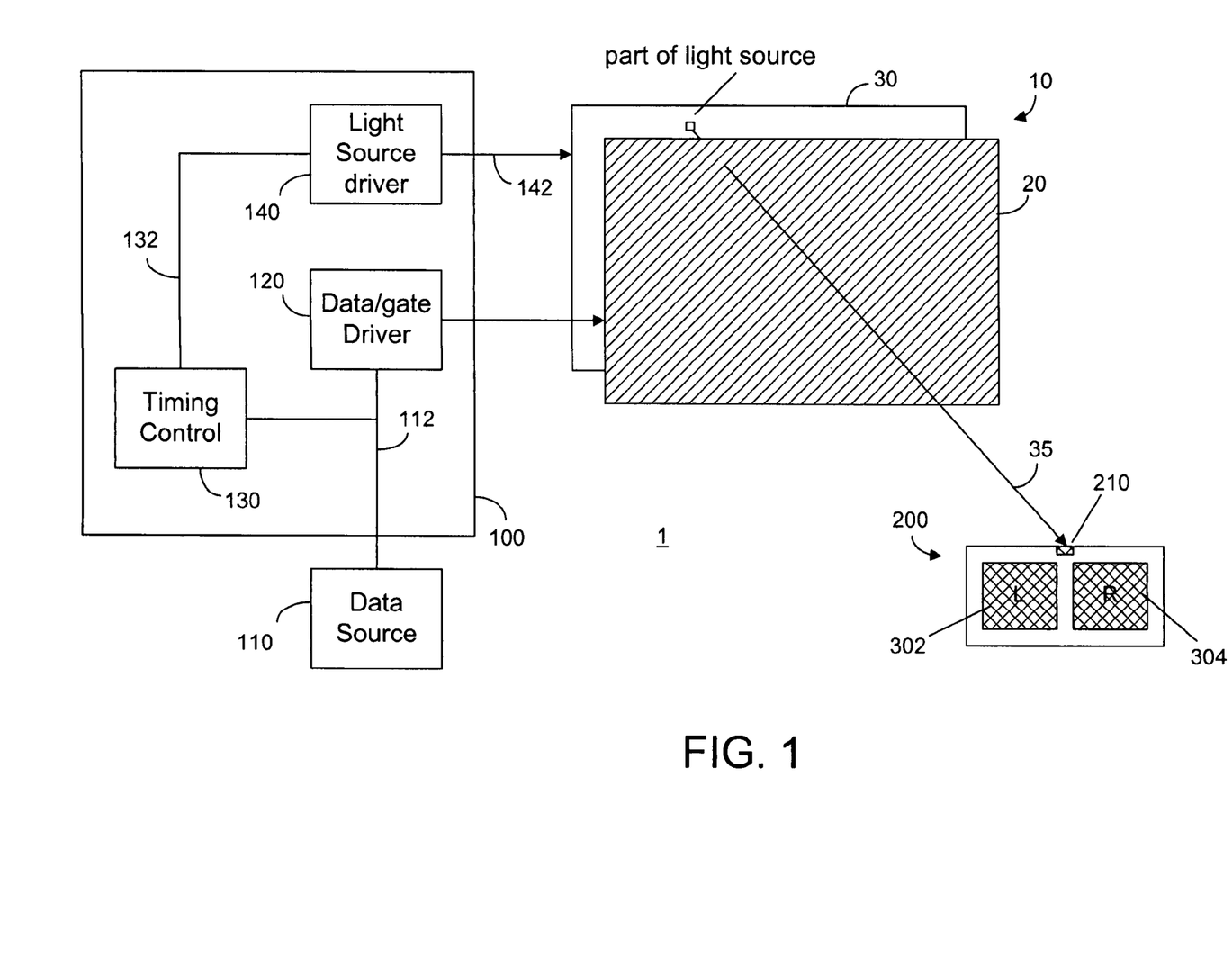
FIG. 1 is a graphical representation showing a 3D display system, according to one embodiment of the present invention.

The present invention provides a method and apparatus for synchronizing the opening and closing of the shutters on a viewing apparatus to be used with a 3D display system. The display alternately shows a right image and a left image in a sequence. As shown in FIG. 1, the 3D display system 1 comprises three main components: a display unit 10, a viewing apparatus 200 and a display control module 100. The display control module 100 can be a part of the display unit 10 or separate from the display unit 10. The display unit 10 comprises a display panel 20 and a backlight unit 30. For example, the display panel 20 can be a transmissive or transflective liquid-crystal display (LCD) panel which requires a backlight unit for illumination. The backlight unit 30 can be an LED (light-emitting diode) backlight unit or other type backlight unit. If the backlight unit 30 is a LED backlight unit, then the light source in the backlight unit comprises mainly an array of LEDs. The major requirement for the backlight unit 30 is that the light output from at least part of the backlight unit can be subjected to frequency modulation. Advantageously, the frequency range for frequency modulation is much higher than the data rate and would not produce a flickering effect in a viewer's eyes. For example, the modulation frequency range can be 300 Hz to 100 kHz, whereas the data or frame rate is typically 60-240 Hz. As such, the light output 35 from the backlight unit 30 through the display panel 20 is frequency modulated. The viewing apparatus 200 has a left shutter 302 and a right shutter 304 such that, in order to see a 3D display, a viewer's left eye only sees the display unit 10 through the left shutter 302 and the right eye only sees the display unit 10 through the right shutter 304. Conveniently, the viewing apparatus 200 can be shaped like a pair of glasses—commonly known as shutter glasses. However, the viewing apparatus 200 can be designed as a pair of binoculars or in other shapes. The viewing apparatus 200 comprises a photo-detector unit 210 which is used to detect the modulation frequencies in the light output 35 and to operate the shutters 302, 304 according to detected frequencies.

The modulation of the light output from the backlight unit 30 is controlled by the timing control module or device 130 in the display control module 100. The display control module 100 is configured to receive an image data stream 112 from a data source 110 for providing display image data to the display panel 20 through a data/gate driver 120. The data source 110 can be a part of the display system 1 or a separate data input device such as a personal computer, a DVD player, a video bitstream receiver (wireless or cable) and the like. The image data stream 112 may include the image data for the right images and for the left images alternately provided to the display panel 20 in a time sequence. The image data stream 112 may also include information indicative of whether the image data is intended for the right image or for the left image.

Based on the information, the timing control device 130 controls the modulation frequencies of the light output of backlight unit 30 through a light-source driver 140. For example, when the timing control device 130 receives information indicative of the right or left image, it determines what modulation frequency should be used and sends an electronic signal 132 to the light source driver 140 for changing the modulation frequencies. In response, the light source driver 140 also changes the frequencies in the electrical power or driving current 142 provided to the backlight unit 30 for driving the light source therein. The light source driver may comprise one or more current sources, and the light source may comprise an array of light-emitting diodes (LEDs) or the like.

According to one embodiment of the present invention, a flag embedded in the pixel data can be used as the information indicative of whether the image data is intended for the right image or for the left image. For example, a certain pixel can be served as a flag. When pixel (1, 1) is specified as the flag, it is possible to use the pixel value of pixel (1, 1) to indicate whether the frame being transmitted is for the left eyes or for the right eyes. For example, if the pixel value of pixel (1, 1) is at an odd gray level, the frame is for the left eyes. If the pixel value of pixel (1, 1) is at an even gray level, the frame is for the right eyes. When the pixel value is at gray level 127, the pixel value will be modified to gray level 128 (127+1) or gray level 126 (127−1) if the frame to be transmitted is for the right eyes. When the pixel value is at gray level 64, the pixel value will be modified to gray level 65 (64+1) or gray level 63 (64−1) if the frame to be transmitted is for the left eyes. Since only the pixel value of one pixel is slightly modified, the image to be displayed would remain substantially the same. It should be understood that a different pixel can also be used as the flag and the other predetermined pixel values can also be used to indicate the left/right designations.

Figure 2A:
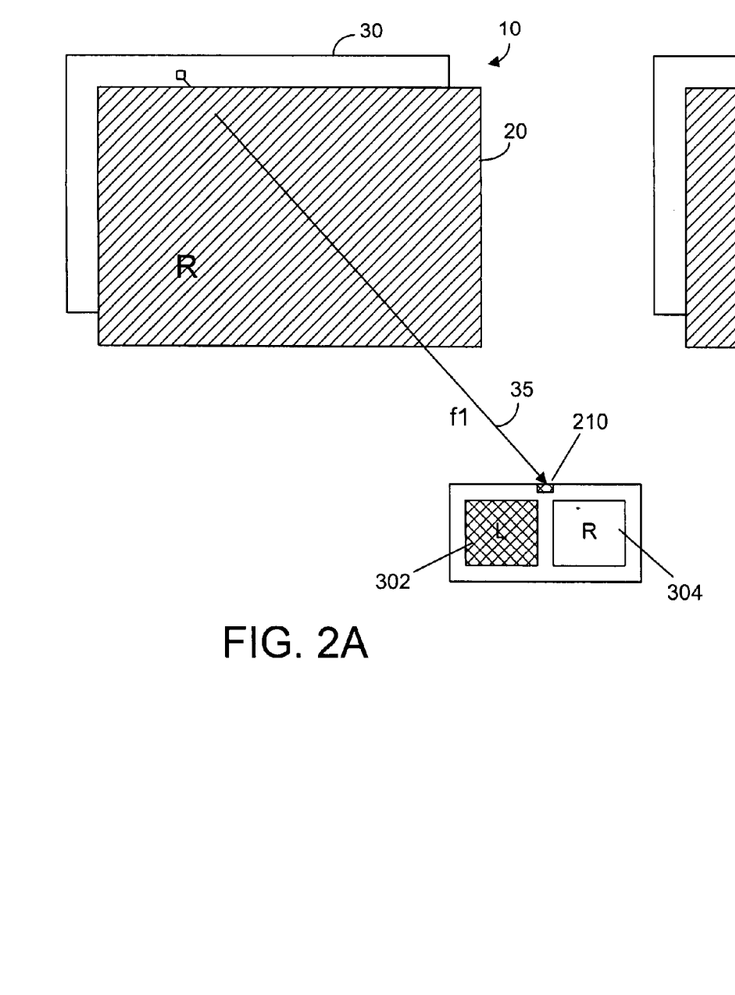
FIGS. 2A and 2B show the principle of the 3D display system, according to one embodiment of the present invention.
Figure 2B:
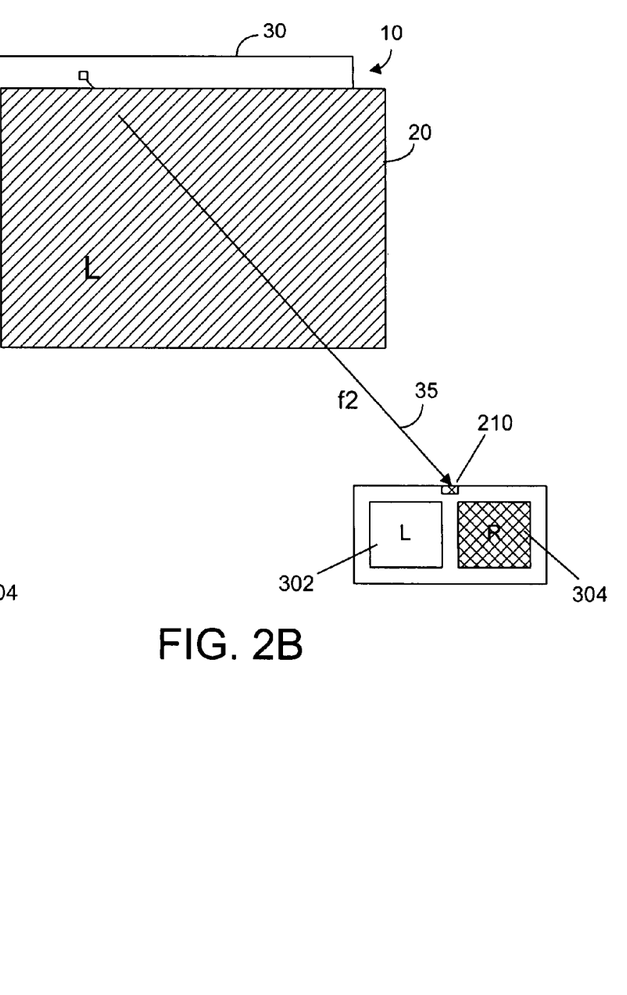

The present invention is mainly concerned with using the modulation-frequency information in the light output 35 from the display unit 10 to control the shutters in the viewing apparatus 200. For example, when the light output 35 carries a modulation frequency f1, the right shutter 304 is opened and the left shutter 302 is closed so that the viewer can only see the display image on the display 10 through the right shutter 304, as shown in FIG. 2A. Similarly, when the light output 35 carries a different modulation frequency f2, the right shutter 304 is closed and the left shutter 302 is opened so that the viewer can only see the display image on the display unit 10 through the left shutter 302, as shown in FIG. 2B. Thus, when the display panel 20 shows a left image L, the light source in the backlight unit 10 is driven such that the light output carries a modulation frequency of f1 at least part of a frame time (see FIG. 3A, for example). Likewise, when the display panel 20 shows a right image R, the light source in the backlight unit 30 is driven such that the light output carries a modulation frequency of f2 at least part of a frame time.

It should be noted that when the display image changes from one image frame to another image frame, the display image of the current frame may still show some of the image data of the previous frame, because the loading of image data onto the display does not happen instantaneously. For example, in a LCD display, each of the pixels and sub-pixels would have a storage capacitor to store the image data provided to the pixel or sub-pixel so that the image data on that pixel or sub-pixel will be displayed even after the data loading is over and until new image data is loaded. Thus, until the loading of image data for an image frame is completed, the displayed image of one frame is mixed with the displayed image of the previous frame. In a 3D display where a right image frame is displayed after a left image frame in an alternate sequence, the displayed right image is partially mixed with the previous left image. In order to achieve a better 3D effect, it is preferable that both shutters on the viewing apparatus are closed during the image data loading period so that the viewer will not see a mixed left-right image.

Figure 3:
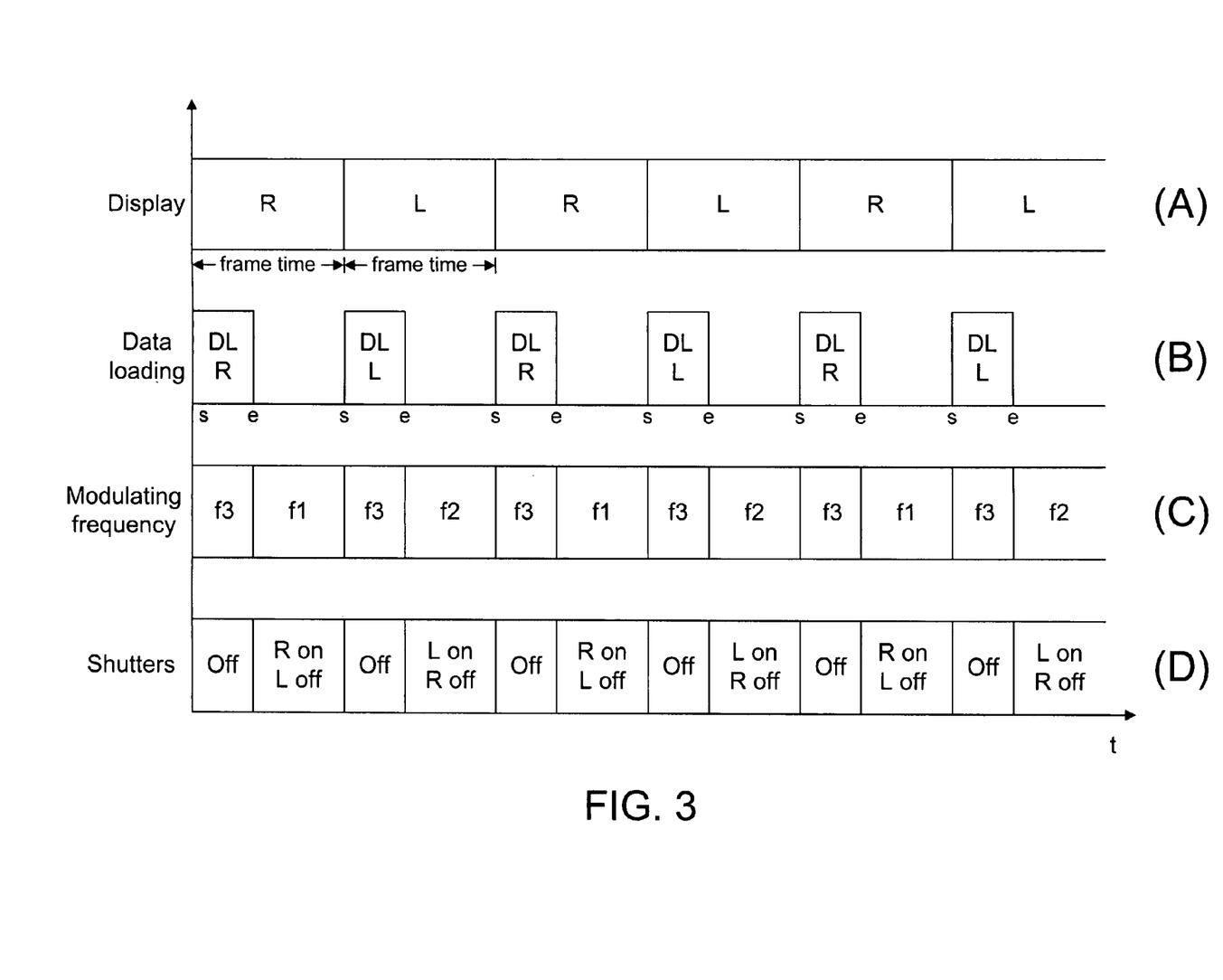
FIG. 3A shows a series of right and left images displayed in a sequence.
FIG. 3B shows the data loading sequence for providing image data to the display.
FIG. 3C shows the light modulation frequencies in relationship to the data loading sequence.
FIG. 3D shows the states of the viewing apparatus in relationship to the light modulation frequencies.

The timing for opening or closing the shutters on the viewing apparatus is shown in FIG. 3D. As shown in FIGS. 3A and 3B, a right image R is displayed on the display panel starts from the start of the image data loading for the current right image R until the start of the image data loading for the following left image L. Likewise, a left image L is displayed on the display panel starts from the start of the image data loading for the current left image L until the start of the image data loading for the following right image R. In FIG. 3B, the data loading period for a right image is denoted as DL R and the data loading period for a left image is denoted as DL L. Each period is marked by s (start) and e (end). It is preferable that both the left and right shutters are closed in the image data loading periods as shown in FIG. 3D. Thus, the right shutter is opened only after the image data loading for a right image R is completed and the left shutter is opened only after the image data loading for a left image L is completed. While the right shutter is opened (R on), the left shutter is closed (L off) and vise-versa. In order to open and close the shutters at the desired timing, the output of the light source in the backlight unit 30 (FIG. 1) is frequency-modulated at a pre-determined frequency at a time period, as shown in FIG. 3C. For example, when the light modulation frequency is f1, the right shutter is opened and the left shutter is closed. Similarly, when the light modulation frequency is f2, the left shutter is opened (L on) and the right shutter is closed (R off). But when it is desirable to close both the right shutter and the left shutter, the light output can be un-modulated or modulated at yet another frequency f3. For example, f1, f2 and f3 can be 4,000 Hz, 1,000 Hz and 2,000 Hz in a 50% duty cycle. However, these three frequencies can be different. For example, f1, f2 and f3 can be 5,000 Hz, 10,000 Hz and 300 Hz, respectively. Also, the duty cycle can be different. For example, the duty cycle can be 60% or higher in order to increase the brightness. According to the present invention, the changing of modulation frequencies is controlled by the timing control device 130 (FIG. 1). The timing control device 130 is configured to detect from the image data stream 112 the start (s) and the end (e) of the image data loading period for each image frame as shown in FIG. 3B. It is also configured to recognize from the image data whether the image data is for the right image or for the left image. Based on the information from the image data stream 112, the timing control 130 sends out a signal 132 indicative of the modulation frequencies to the light source driver 140. The light source driver 140 is configured to provide frequency-modulated power output to the backlight unit 30. The modulation frequency range can be 300 Hz to 100 kHz, for example, but it can be higher or lower, depending on the ambience and the display panel used.

Figure 4:
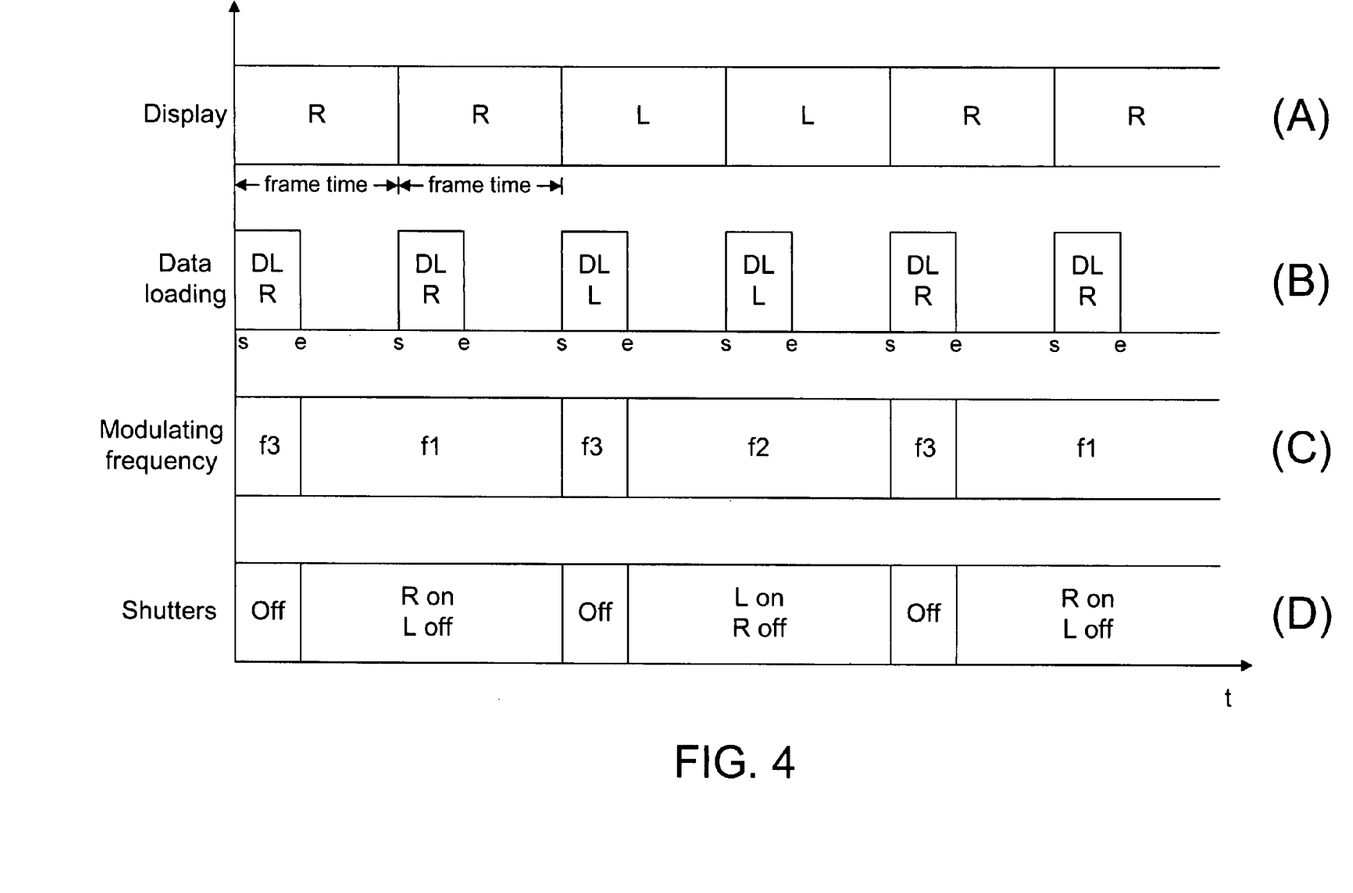
FIGS. 4A to 4D show the timing of frequency modulation and the states of the viewing apparatus when two images of the same view are sequentially displayed.

It should be noted that it may not be necessary to close both shutters on the viewing apparatus every time the image data is loaded onto the display panel 20. For example, if the switching between right and left images takes place after displaying two or more images of the same view as shown in FIG. 4, it would not be necessary to close both shutters during the image data loading for the second frame. As shown in FIG. 4, the right shutter remains open during the second right image data loading period. The number of images of the same view (R or L) that can be displayed consecutively before changing to another view depends on the frame rate.

Figure 5:
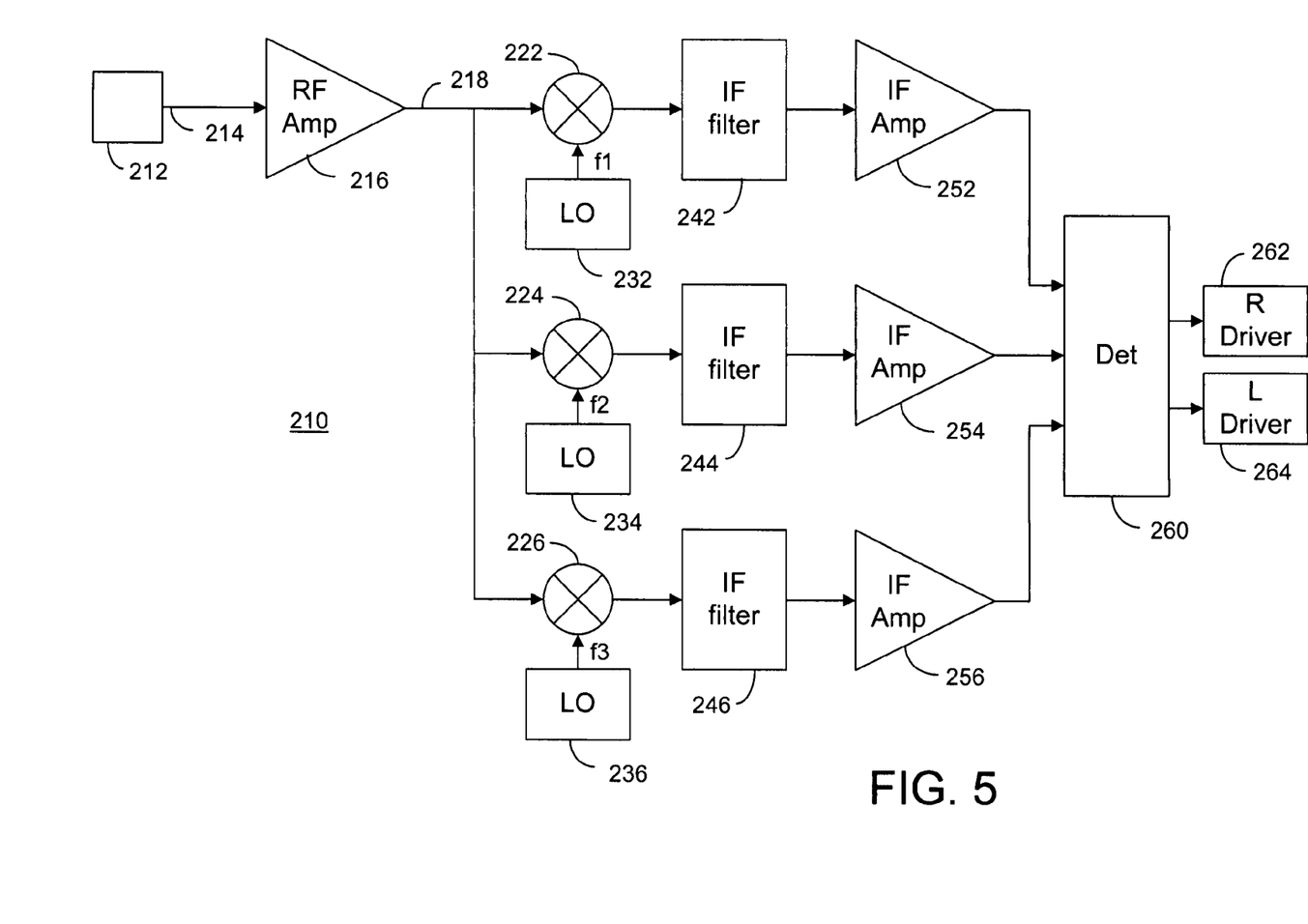
FIG. 5 is an exemplary circuit for use in detecting the frequency-modulated light beam and driving the shutters.

An exemplary circuit for the photo-detector unit 210 is shown in FIG. 5. As shown, the photo-detector unit 210 comprises a photo-sensor 212 configured to convert detected light into an electrical signal 214. An RF amplifier 216 is then used to amplify the electrical signal 214 into an amplified electrical signal 218. In order to detect whether the light output 35 (FIG. 1) carries one of three pre-determined frequencies f1, f2 and f3, three frequency demodulators are used in the photo-detector unit 210. Each of the frequency demodulators comprises a mixer (222, 224, 226), a local oscillator (232, 234, 236), an IF filter (242, 244, 246) and an IF amplifier (252, 254, 256), for example. It is understood that the frequency of each local oscillator and the filtering frequency of each IF filter are set to match a different one of the pre-determined frequencies f1, f2 and f3. From the output of the IF amplifiers, a discriminator or signal detector 260 is used to find out the modulation frequency in the amplified electrical signal 218. If the modulation frequency is f1, the discriminator 260 would send a signal to the shutter driver (R driver) 262 for opening the right shutter 304 (FIG. 2A). If the modulation frequency is f2, the discriminator 260 would send a signal to the shutter driver (L driver) 264 for opening the left shutter 302 (FIG. 2B). If the modulation frequency is f3, both the left and right shutters are closed. According to one embodiment of the present invention, if the amplified electrical signal 218 is not frequency-modulated or is modulated at a frequency different from anyone of the three pre-determined frequencies f1, f2 and f3, the discriminator 260 would send a signal to both shutter drivers 262, 264 in order to open both the right shutter 304 and the left shutter 302.

Figure 6:
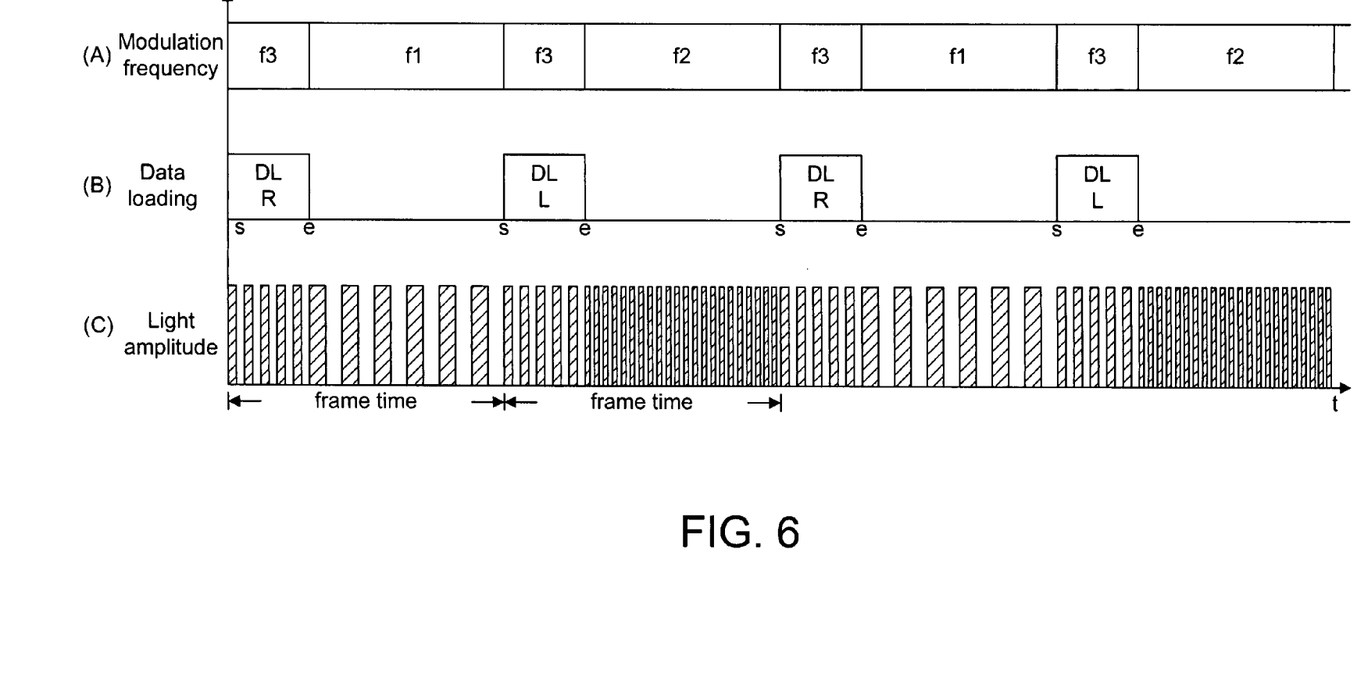
FIG. 6 illustrates different modulation frequencies being used at different periods of the 3D display.

FIG. 6 shows different frequencies f1, f2 and f3 being used to modulate the output of the backlight unit at different periods in the 3D display, according to one embodiment of the present invention. As shown, f3 is used in the data loading periods. In any period, the light amplitude or intensity of the output from the backlight unit has a 50% duty cycle and is shaped like a square wave. It should be noted that, however, the duty cycle can be less than 50% or more than 50%. Moreover, the light amplitude can have a waveform expressible as $a(\cos ft/2\pi + 1) + b$ or the like.

Figure 7:
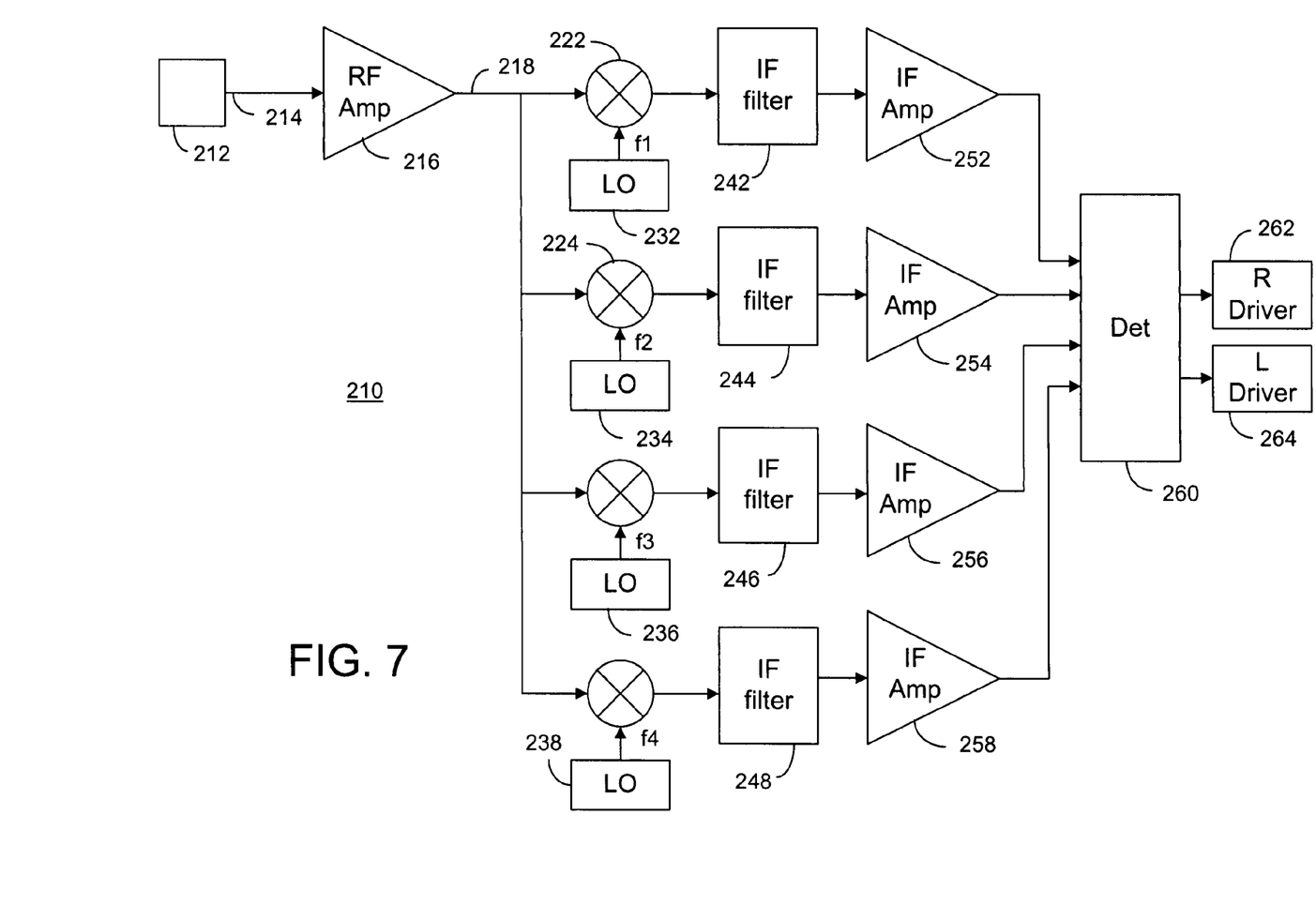
FIG. 7 shows another circuit for use in detecting the frequency-modulated light beam and driving the shutters.

It should be noted that the 3D display system, according to various embodiments of the present invention, can be used as a 2D display system as well. In one embodiment of the present invention, when a 2D scene is displayed on the display panel 20, the light source driver 140 (see FIG. 1) provides a DC power to the backlight unit 30 so that the light output 35 is not modulated. Accordingly, the discriminator 260 (see FIG. 5) would send a signal to both the shutter driver 262, 264 for opening both the right shutter 304 and the left shutter 302. Alternatively, when the display system displays a 2D scene, the light output 35 is modulated in a different frequency f4. In order to detect the fourth frequency, the photo-detector unit on the viewing apparatus comprises four frequency demodulators. As shown in FIG. 7, the photo-detector unit 210 has a fourth frequency demodulator comprising a mixer 228, a local oscillation 238, an IF filter 248 and an IF amplifier 258. The frequency of the local oscillator 238 and the filtering frequency of the IF filter 248 are set to match f4. Upon detecting the modulation frequency f4, the discriminator 260 sends a signal to both shutter drivers 262, 264 in order to open both the right shutter 304 and the left shutter 302.

In summary, the present invention provides a display system. The display system includes a display panel configured to display a sequence of display images, the display images separately comprising left-view images and right-view images; a light source configured to provide illumination to the display panel, and a light source driver for providing electrical power to the light source, the light source driver configured to control the electrical power so as to modulate the light source output with a first frequency during at least part of a time period when at least one of the left-view images is displayed, and to modulate the light source output with a second frequency during at least part of a time period when at least one of the right-view images is displayed. The display system also has a viewing apparatus. The viewing apparatus includes a detector configured to detect light output of the light source; a left shutter configured to open for viewing the left-view images when the light source output is modulated in the first frequency; and a right shutter configured to open for viewing the right-view images when the light source output is modulated in the second frequency. In the data loading period for each image frame, it is preferable to close both the left and right shutters.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for use in a display system, the display system comprising:
   a display panel configured to display a sequence of display images, the display images separately comprising left-view images and right-view images;
   a light source configured to provide light output for illuminating the display panel; and
   a viewing apparatus for viewing the display images, said method comprising:
   modulating the light output in a first frequency during at least part of a time period when at least one of the left-view images is displayed; and
   modulating the light output in a second frequency different from the first frequency during at least part of a time period when at least one of the right-view images is displayed, wherein the time period when said at least one of the left-view images is displayed comprises a first data loading period, and the time period when said at least one of the right-view images is displayed comprises a second data loading period, and wherein the light source is configured to provide the light output for illuminating the display panel during and after the first data loading period and during and after the second data loading period.

2. The method according to claim 1, wherein the viewing apparatus comprises:
   a first shutter configured to open for viewing the left-view images after the first data loading period; and
   a second shutter configured to open for viewing the right-view images after the second data loading period, said method further comprising:
   opening the first shutter only when the light output is modulated in the first frequency; and
   opening the second shutter only when the light output is modulated in the second frequency.

3. The method according to claim 2, further comprising:
   modulating the light output in a third frequency in the first data loading period and in the second data loading period; and
   closing the first shutter and the second shutter when the light output is modulated in the third frequency, wherein the third frequency is different from the first frequency and the second frequency.

4. The method according to claim 2, wherein the viewing apparatus further comprises a detector configured to detect the light output of the light source for providing a signal indicative of a detected modulation frequency, and a shutter driver for controlling the first shutter and the second shutter based on the detected modulation frequency.

5. The method according to claim 2, wherein the detector is configured to detect the light output of the light source through at least part of the display panel.

6. The method according to claim 1, wherein the display panel is configured to receive a data stream comprising left-view image data and right-view image data, the data stream comprising information indicative of the left-view image data and the right-view image data, and wherein said modulating the light output in the first frequency and in the second frequency is based on the information.

7. The method according to claim 1, wherein the display panel comprises a liquid crystal display panel and the light source comprises a backlight unit.

8. The method according to claim 2, wherein the display panel is configured to display a 2-dimenional scene wherein the left-view images are substantially the same as the right-view images, said method furthering comprising:
   modulating the light output in a third frequency different from the first frequency and the second frequency when the display panel display the 2-dimensional scene; and
   opening the first shutter and the second shutter when the light output is modulated at the third frequency.

9. A display system comprising:
   a display panel configured to display a sequence of display images, the display images separately comprising left-view images and right-view images;
   a light source configured to provide light output for illuminating the display panel, and
   a light source driver for providing electrical power to the light source, the light source driver configured to control the electrical power so as to modulate the light output in a first frequency during at least part of a time period when at least one of the left-view images is displayed, and to modulate the light output in a different second frequency during at least part of a time period when at least one of the right-view images is displayed, wherein the time period when said at least one of the left-view images is displayed comprises a first data loading period, and the time period when said at least one of the right-view images is displayed comprises a second data loading period, and wherein the light source is configured to provide the light output for illuminating the display panel during and after the first data loading period and during and after the second data loading period.

10. The display system according to claim 9, further comprising a viewing apparatus, the viewing apparatus comprising:
    a detector configured to detect the light output of the light source;
    a first shutter configured to open for viewing the left-view images only when the light output is modulated in the first frequency after the first data loading period; and
    a second shutter configured to open for viewing the right-view images only when the light output is modulated in the second frequency after the second data loading period.

11. The display system according to claim 9, wherein the light source driving unit further is configured to control the electrical power so as to modulate the light output in a third frequency in the first data loading period and in the second data loading period.

12. The display system according to claim 11, further comprising a viewing apparatus, the viewing apparatus comprising:
- a detector configured to detect the light output of the light source;
- a first shutter configured to open for viewing the left-view images when the light output is modulated in the first frequency; and
- a second shutter configured to open for viewing the right-view images when the light output is modulated in the second frequency, wherein the first shutter and the second shutter are configured to close when the light output is modulated in the third frequency.

13. The display system according to claim 9 wherein the display panel comprises a liquid crystal display panel.

14. The display system according to claim 9, wherein the light source comprises an array of light emitting diodes.

15. The display system according to claim 12, wherein the first frequency, the second frequency and the third frequency are different frequencies in a frequency range, and wherein the first shutter and the second shutter are configured to open concurrently when variation in the light output is outside said frequency range.

16. A viewing apparatus for use in a display system, the display system comprising:
- a display panel configured to display a sequence of display images, the display images separately comprising left-view images and right-view images;
- a light source configured to provide light output for illuminating the display panel, and
- a light source driver for providing electrical power to the light source, the light source driver configured to control the electrical power so as to modulate the light output in a first frequency during at least part of a time period when at least one of the left-view images is displayed, and to modulate the light output in a different second frequency during at least part of a time period when at least one of the right-view images is displayed, wherein the time period when said at least one of the left-view images is displayed comprises a first data loading period, and the time period when said at least one of the right-view images is displayed comprises a second data loading period, and wherein the light source is configured to provide the light output for illuminating the display panel during and after the first data loading period and during and after the second data loading period, said viewing apparatus comprising:
- a detector configured to detect light output from the light source;
- a first shutter configured to open only when the light output is modulated in a first frequency; and
- a second shutter configured to open only when the light output is modulated in a different second frequency.

17. The viewing apparatus according to claim 16, wherein the detector comprises:
- an optoelectric sensor configured to provide an electrical signal in response to the light output; and
- a shutter driver, responsive to the electrical signal, configured to open only the first shutter when the light output is modulated in a first frequency, and to open only the second shutter when the light output is modulated in the second frequency.

18. The viewing apparatus according to claim 17, wherein the shutter driver is configured to close both the first shutter and the second shutter when the light output is modulated in a third frequency.

19. The viewing apparatus according to claim 18, wherein the shutter driver is configured to open both the first shutter and the second shutter when the light output is modulated in a fourth frequency.

20. The viewing apparatus according to claim 16, wherein the light source is configured to provide the light output for illuminating a display panel, the display panel configured to display a sequence of display images separately comprising left-view images and right-view images, and the light output is modulated in the first frequency during at least part of the time period when at least one of the left-view images is displayed, and the light output is modulated in the second frequency during at least part of a time period when at least one of the right-view images is displayed, wherein the time period when said at least one of the left-view images is displayed comprises a first data loading period, and the time period when said at least one of the right-view images is displayed comprises a second data loading period, and wherein the light source is configured to provide the light output for illuminating the display panel during and after the first data loading period and during and after the second data loading period.

* * * * *